March 26, 1968

A. J. MULLARKEY 3,375,509

PLURAL PARAMETERS MONITOR DISPLAYING INFORMATION
SIGNALS AS A BAR GRAPH ON A CATHODE-RAY TUBE

Filed Nov. 23, 1964

Inventor

A. J. MULLARKEY

By

March 26, 1968  A. J. MULLARKEY  3,375,509
PLURAL PARAMETERS MONITOR DISPLAYING INFORMATION
SIGNALS AS A BAR GRAPH ON A CATHODE-RAY TUBE
Filed Nov. 23, 1964  2 Sheets-Sheet 2

Inventor
A.J. MULLARKEY

United States Patent Office 3,375,509
Patented Mar. 26, 1968

3,375,509
PLURAL PARAMETERS MONITOR DISPLAYING INFORMATION SIGNALS AS A BAR GRAPH ON A CATHODE-RAY TUBE
Alfred John Mullarkey, London, England, assignor to International Standard Electric Corporation, New York, N.Y., a corporation of Delaware
Filed Nov. 23, 1964, Ser. No. 413,017
Claims priority, application Great Britain, Dec. 3, 1963, 47,659/63
10 Claims. (Cl. 340—213)

ABSTRACT OF THE DISCLOSURE

A number of measurements being monitored are displayed as horizontal line segments on a cathode-ray tube—a vertical display control circuit disposes each line segment at the same vertical location when the respective measurement is of correct or predetermined value thereby forming a straight line. Deviations from a required measurement value immediately stand out because of its displacement from the straight line.

---

The present invention relates to an electrical display arrangement of the type in which a visible indication is given of whether or not any one or more of a number of monitored parameters differs from its desired value.

Display arrangements of the above type are used in power generating stations, where it is often inconvenient for the operator to have to observe a large number of meters. For this reason, an arrangement which is known as a "master cluster" is used, which consists of a block of measuring instruments arranged side by side. In conventional systems, these measuring instruments are moving coil or the like electrical instruments mounted with their movements parallel. The display given by each of these instruments is a line across at right angles to the direction of movement. The instruments are so set up that when all of the parameters to which they relate are at their normal or desired value, the display given by the set of aligned instruments is a straight line. If the quantity being measured by any one of these instruments departs from its intended value, then the display appears to the operator as a line broken at one point by a short section which he sees displayed either above or below the line. This form of display acts as a notification to the operator that something is wrong. He is then able to consult the meter relating to the appropriate quantity so as to get a better idea of the situation.

It is an object of the present invention to provide an electronic arrangement for giving a "master cluster" type of indication, and also to provide a more compact form of "master cluster" indication than is possible with the electro-mechanical arrangements referred to above.

According to the present invention there is provided an electrical display arrangement of the type in which a visible indication is given of whether or not any one or more of a number of monitored parameters depart from its desired value, in which an electronic indicator device is used which presents a visible and illuminated trace which is modulated in accordance with the instantaneous values of said parameters, in which as long as each of said parameters is equal to, or close to, its desired value the trace of said electronic indicator device is a straight line or an approximation thereto, and in which if any parameter should depart from its desired value its portion of the trace appears displaced from said straight lines.

In the arrangement to be described later, the electronic indicator device used is a cathode-ray tube, but other electronic indicator devices exist, which may be used in place of the cathode-ray tube. A further point to be noted is that the reference in the preceding paragraph to a visible and illuminated trace is intended to refer to a trace which appears as a line of light on a nonilluminated surface or to a line of darkness which appears on an illuminated surface.

An embodiment of the invention will now be described with reference to the accompanying drawings, in which.

The display arrangement to be described is a master cluster arrangement for a set of twelve parameters. In the case of an electrical power generating station, examples of the parameters whose indication is dealt with by the arrangement shown are steam temperatures, re-heat steam temperatures, critical steam pressure, megawatt output, steam flow, feed flow, and such quantities which are of interest in determining the correct or otherwise operation of the power station. The arrangement is, of course, equally applicable to indicating parameters in circumstances other than that of a power station, but in which similar considerations as to type of indication needed arise.

Figure 1:
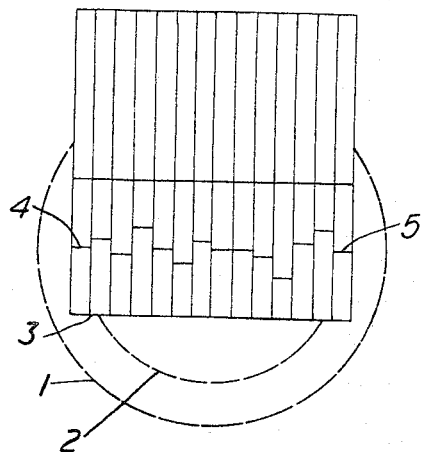
FIG. 1 shows diagrammatically the type of display given by an indicator according to the invention.

In FIG. 1, the outer circle 1 indicates the outside diameter of a circular cathode-ray tube screen, and the inner circle 2 indicates, roughly, the useful area of that screen. Mounted over the screen and over part of the front panel is a sheet of a transparent material, such as a plastics material, having a set of vertical lines engraved on it. This sheet is indicated at 3. As shown, it has a lower portion which is 2 inches deep and has a length of 4⅛ inches, and an upper portion which is 2½ inches long. There are a number of vertical lines on this plastic sheet, and the space between each pair of vertical lines, except the endmost two spaces, relates to one of the parameters being measured.

The uppermost portion of the plastic sheet bears, between its pair of vertical lines, inscriptions indicative of the identities of the various parameters. The endmost spaces each contain the word "datum," and the lowermost portion of the plastic sheet has in the end portions short transverse lines. These short datum lines are indicated at 4 and 5 respectively.

A trace of the cathode-ray tube is modulated in accordance with the instantaneous values of the twelve parameters being monitored, and each instantaneous value when determined is used to control the position of the cathode-ray tube trace. The cathode-ray tube display is initially so adjusted that if all parameters are correct then the cathode-ray tube trace appears as a single straight line which interconnects the two datum lines 4 and 5. It will be appreciated that this is, in fact, an ideal case which will rarely in practice exist. Consequently even when all the parameters are close enough to the prior value for satisfactory operation, the display will be far from a solid line trace. However, as long as the differences from the desired value are relatively small, or the inaccuracies of the equipment are relatively small, the display will approximate to a straight line display.

The manner in which the instantaneous values of the parameters are caused to appear on the screen of the cathode-ray tube will be described later with reference to FIG. 3.

Figure 2:
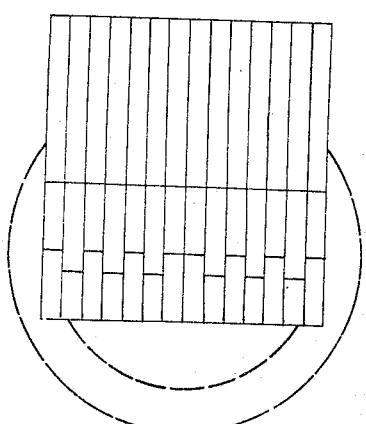
FIG. 2 shows the display device indicated diagrammatically in FIG. 1, but with a calibration pattern being displayed.

FIG. 2 shows the display arrangement of FIG. 1, but with a calibration pattern present in place of the display pattern representative of the monitored quantities. The production and use of this pattern will be described later.

It will be appreciated that various forms of cathode-ray tubes can be used, and that in addition to the circular cathode-ray tube which is illustrated in FIGS. 1 and 2, a rectangular cathode-ray tube is possible, a flat-faced cathode-ray tube is preferable to one with a curved face, as it allows the plastics sheet bearing the graticule to be fitted closely to the face of the tube. Such a fitting eliminates parallax distortion between the engraved lines on the sheet and the line trace on the cathode-ray tube.

Figure 3:
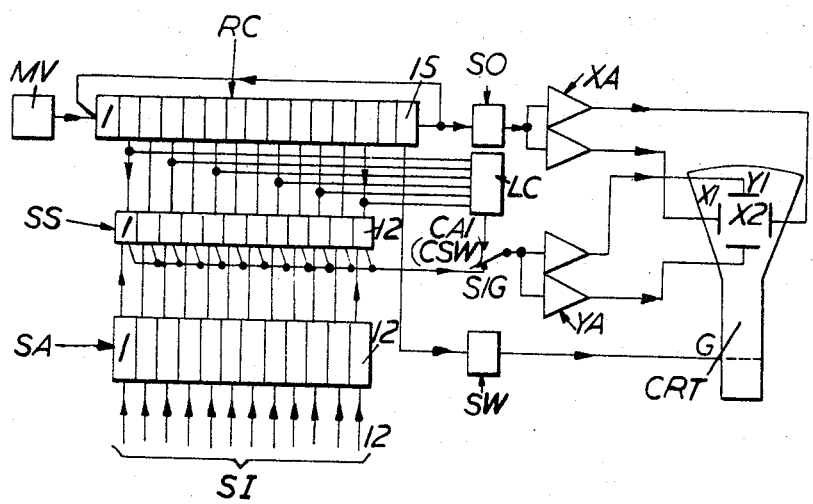
FIG. 3 is a simplified block diagram of the electronic circuitry necessary to give the display according to the invention.

Turning now to FIG. 3, which is a block diagram of the control arrangement for the display device, this will be described briefly. The arrangement is controlled by a free running multivibrator MV, which emits square wave impulses which are used to drive a ring counter RC. This counter has fifteen stages and its last stage is connected back to its first stage so that it acts as a closed ring counter. In accordance with conventional practice, only one stage of the ring counter is in the operated or conductive condition at a time, and for each pulse received from the multivibrator the operated condition is moved one stage along the counter. Since it is a closed-loop counter, the pulse which arrives when the counter is in its condition with stage 15 operated sets the counter back to its condition with stage 1 operated. Stages 2 to 13 of the counter and stage 15 of the counter have output connections and each of these output connections will therefore be energised once during the cycle of the counter.

The outputs numbers 2 to 13 of the counter RC are taken to a set of twelve sampling switches SS, and each of these switches is normally open, i.e., non-conductive, when a pulse is received from its stage of the counter, but is rendered conductive by the pulse it receives.

Electrical voltages, which are assumed in the present case to be direct voltages, representative of the twelve parameters being monitored are received by the equipment shown on a set of twelve signal inputs SI. Each of these inputs feeds one of a set of twelve signal amplifiers SA. Each amplifier has two controls, these being sensitivity and zero setting. The sensitivity control enables each amplifier to be so adjusted that a small deviation in the input signal may produce the same output from the amplifier as a large deviation in the input signal. That is, as soon as any one of the parameters being measured deviates from its intended value, a constant and relatively large response is produced to that deviation. The zero setting control for one of the amplifiers SA, as its name implies, enables the output signals from the amplifier to be set to zero according to the nominal value of the input signal. That is, if the voltage on the input to one of the amplifiers is the voltage appropriate to correct operation, the zero setting control is adjusted so that the amplifier has no output. However, any deviation from this input, whether in the increasing or decreasing sense, is caused to produce a relatively large output from the corresponding amplifier.

Outputs from the twelve signal amplifiers SA are applied respectively to the sampling switches SS. As each of these sampling switches closes, i.e., is rendered conductive by a pulse from the counter, its signal is connected via that switch to the common output from the set of switches SS. Thus the sampling switches are, in effect a set of gates which are sequentially operated under the control of the ring counter to complete circuits therethrough, thus performing the function of a distributor.

At this point it is necessary to consider the arrangements for scanning by the cathode-ray tube. The output from stage 15 of the ring counter RC is connected to a sawtooth oscillator SO, which provides the X time base for the cathode-ray tube. The arrangement is such that for every complete cycle of the counter, one complete waveform is produced by SO. This waveform rises in a substantially linear manner during the count from stages 1 to 14, and the arrival of an output pulse from stage 15 to the oscillator SO causes the latter to return to zero.

The sawtooth waveform produced by the oscillator SO is applied via a pair of scanning amplifiers XA to the X plates of the cathode-ray tube indicated at CRT. The beam of the cathode-ray tube is thus deflected across the face of the tube so as to display a horizontal line. A gain control is provided so that the width of the line scan can be adjusted. It should be noted that in addition, all the usual controls of the cathode-ray tube, such as brilliancy, are provided if desired.

The outputs from stages 1 and 14 of the ring counter are not used for control purposes, since, as already mentioned the display has a datum line at each end of the trace. These datum lines are accommodated at the ends of the trace at the positions which would have been occupied by the outputs due to stages 1 and 14 of the counter.

The operation of the arrangement will now be described. As each signal input is sampled in turn, the output from SS, which therefore consists of a set of pulses each of which corresponds to the relation between the value of one of the parameters and the value which it should have, is applied via a switch CSW to a further pair of deflection amplifiers YA. The outputs of these amplifiers are applied to the Y plates of the cathode-ray tube. Thus as each of the sampling switches closes to complete the circuit therethrough the signal input corresponding thereto is applied via the switch CSW and the amplifiers YA to the Y plates of the cathode-ray tube. The signal level is amplified proportionally to its input and consequently the beam of the cathode ray tube is deflected up or down depending on whether the signal is above or below the nominal setting. Consequently, since the saw-tooth oscillator is synchronised with the ring counter RC, it will be seen that the signal being sampled is in correct relationship with the line scan, and therefore appears at a precise position on the face of the cathode-ray tube. Consequently any divergence of a parameter from its intended value can be clearly seen by a glance at the cathode-ray tube.

Position 15 of the counter is provided to allow time for the fly-back of the line scan. The output from this stage is connected to a suppression switch SW, which applies a negative bias to the grid of the cathode-ray tube whenever the counter is on position 15. Thus the fly-back is blacked out.

In order to calibrate the display arrangement, a line calibration mixer LC is provided for checking the line scan. When calibration is to be performed, the switch CSW is reversed to its other position, in which the amplifiers YA are fed from the mixer LC. The inputs to this mixer consist of pulses taken from a selection of the outputs of the ring counter. In the circuit shown in FIG. 3, the outputs from stages 2, 4, 6, 9, 11 and 13 are used for this purpose. Consequently a set of square wave pulses appears as the output from this mixer, which produces a display on the cathode ray tube face of the type illustrated in FIG. 2. When this display is produced, the width of the line scan is adjusted so that each pulse is accurately positioned, as far as possible, between two adjacent vertically engraved lines on the plastic sheet.

In one particular example of circuit according to the invention, the system is constructed from electronic circuitry using solid state devices, the active elements being either diodes or transistors. The circuit is mounted on plug-in boards and the circuits themselves might be printed circuits. The multivibrator runs at a frequency of approximately 8 kilocycles, which is considered fast enough to give a flickerless display for twelve signal channels.

An extra facility can readily be provided to assist in setting the signal amplifiers if the signals are off normal. This is to provide means in each amplifier to simulate its signal. Then a manual key can be operated to disconnect the real signal and apply the simulated signal. The amplifiers are then balanced to line up with the datum line on the cathode ray tube, as thereafter the real signals are reconnected.

Note also that although in the example described solid state circuitry is used, vacuum tubes could equally be used.

A possible extension of the arrangement is to have two or more line traces on the same tube screen, each relating to a different set of signals.

It is to be understood that the foregoing description of specific examples of this invention is made by way of example only and is not to be considered as a limitation on its scope.

I claim:

1. A system for indicating normalcy and abnormalcy of parameters in a multiplicity of functions being monitored and having parameters being measured comprising:

(a) means forming a source of pulsed energy having a predetermined frequency;
    (b) multistage counter means connected to said source of pulsed energy so that successive pulses energize successive stages of the counter;
    (c) multisource receiver means correlated to the functions being monitored and parameters being measured and adapted to receive data from a multiplicity of sources indicating normalcy or abnormalcy of parameters measured at each source;
    (d) distribution means correlated with said counter means and said multisource receiver means to synchronize in point of time a pulse from said counter means with data received at said multisource data receiver means; and
    (e) means operatively associated with said multistage counter means and said distribution means for converting pulse energy from said counter and data from said multisource receiver means into an intelligible indication of the normalcy or abnormalcy of the parameters being measured.

2. The combination according to claim 1, characterized in that said means forming a source of pulsed energy constitutes a multivibrator having a square wave output.

3. The combination according to claim 1, characterized in that said multistage counter means includes fifteen separate stages, with the fifteenth stage connected to stage 1 to form a closed ring counter.

4. The combination according to claim 1, in which said multisource receiver means comprises a set of signal amplifiers connected to measuring devices associated with the functions being monitored.

5. The combination according to claim 1, in which said distribution means constitutes a plurality of switches, each operatively associated with a predetermined stage of said multistage counter means and said multisource receiver means.

6. The combination according to claim 1, in which said means for converting pulse energy from said counter and data from said multisource receiver means into an intelligible indication of the normalcy or abnormalcy of the parameters being measured comprises a cathode-ray tube including a control grid and vertical and horizontal deflection plates.

7. The combination according to claim 1, characterized in that said means for converting pulse energy from said counter and data from said multisource receiver means into an intelligible indication of the normalcy or abnormalcy of the parameters being measured includes a cathode-ray tube including vertical and horizontal deflection plates therewithin, a first scanning amplifier operatively interposed between the horizontal deflection plates and said multistage counter means, and a second scanning amplifier operatively interposed between said vertical deflection plates and said distribution means.

8. The combination according to claim 1, in which said means forming a source of pulsed energy having a predetermined frequency constitutes a multivibrator having a square wave output and operating at approximately eight kilocycles frequency, said multistage counter means is electrically connected to said multivibrator output so that successive pulses from the multivibrator energize successive stages along the counter, the last stage of the counter being interconnected with the first stage thereof so that energization of said last stage closes the ring so that the next successive pulse from the multivibrator reenergizes the first stage of the counter.

9. The combination according to claim 1, in which said means forming a source of pulsed energy comprises a multivibrator operating at eight kilocycles frequency and having a square wave output, said multistage counter means comprises a closed ring counter including fifteen separate stages with the last stage connected to the first stage and arranged so that only one stage thereof is energized at any given time so that successive pulses from the multivibrator energize successive stages along the ring counter, said distribution means constitutes a set of twelve switches connected respectively to stages 2 through 13 of said ring counter, each said switch being normally open and the outputs of all switches being connected in common, and said multisource receiver means comprises a set of twelve signal amplifiers each of which includes an output connected to one of said switches and an input connected to a measuring device associated with a function being monitored and measured, and said means for converting pulse energy from said counter and data from said multisource receiver means into an intelligible indication of the normalcy or abnormalcy of the parameters being measured includes a cathode-ray tube operatively connected to said set of switches and said counter whereby pulses from said multivibrator and data from said signal amplifiers are synchronized to produce on the screen of said cathode-ray tube a visible trace indicating the normalcy or abnormalcy of the parameter being measured.

10. The combination according to claim 9, in which a sawtooth oscillator and a scanning amplifier are interposed between said closed ring counter and said cathode-ray tube, said sawtooth amplifier being connected to the last stage of the ring counter and arranged so that one waveform is produced by said amplifier by a complete cycle of the counter, the waveform returning to zero value upon energization of the last stage of the counter, the signal from said sawtooth amplifier being applied through said scanning amplifier to the horizontal deflection plates of the cathode-ray tube.

References Cited

UNITED STATES PATENTS 2,412,350  12/1946  Morgan.
2,485,343  10/1949  Zuschlag _____ 340—213

FOREIGN PATENTS 744,354  2/1956  Great Britain.

JOHN W. CALDWELL, *Primary Examiner.*

NEIL C. READ, *Examiner.*

D. MYER, *Assistant Examiner.*